US012739802B2

(12) United States Patent
Medina et al.

(10) Patent No.: US 12,739,802 B2
(45) Date of Patent: Sep. 15, 2026

(54) ENHANCED PSFCH RESOURCE MAPPING FOR STANDALONE SIDELINK CSI-RS

(71) Applicant: Nokia Technologies Oy, Espoo (FI)

(72) Inventors: Daniel Medina, Munich (DE); Torsten Wildschek, Gloucester (GB); Faranaz Sabouri-Sichani, Aalborg (DK); Takayuki Shimizu, Mountain View, CA (US); Claude Arzelier, Molieres-sur-Ceze (FR)

(73) Assignee: Nokia Technologies Oy, Espoo (FI)

( * ) Notice: Subject to any disclaimer, the term of this patent is extended or adjusted under 35 U.S.C. 154(b) by 489 days.

(21) Appl. No.: 18/357,315

(22) Filed: Jul. 24, 2023

(65) Prior Publication Data

US 2025/0039851 A1 Jan. 30, 2025

(51) Int. Cl.
*H04W 72/0446* (2023.01)
*H04W 72/044* (2023.01)
(Continued)

(52) U.S. Cl.
CPC ... *H04W 72/0446* (2013.01); *H04W 72/0453* (2013.01); *H04W 72/046* (2013.01); *H04W 72/0466* (2013.01); *H04W 72/40* (2023.01)

(58) Field of Classification Search
CPC ... H04L 5/0026; H04L 5/0028; H04L 5/0033; H04L 5/0091; H04L 5/0055;
(Continued)

(56) References Cited

U.S. PATENT DOCUMENTS

2022/0303954 A1 9/2022 Hwang et al.
2022/0322329 A1 10/2022 Hui et al.
(Continued)

FOREIGN PATENT DOCUMENTS

WO 2023/081139 A1 5/2023

OTHER PUBLICATIONS

"WID revision: NR sidelink evolution", 3GPP TSG RAN Meeting #99, RP-230077, Agenda: 9.3.1.5, OPPO, Mar. 20-23, 2023, 6 pages.
(Continued)

*Primary Examiner* — Brian D Nguyen
(74) *Attorney, Agent, or Firm* — Lippes Mathias LLP

(57) ABSTRACT

An apparatus comprising: at least one processor; and at least one memory storing instructions that, when executed by the at least one processor, cause the apparatus at least to: determine a first allocation comprising at least one of: a first time-domain allocation comprising at least one symbol within a slot associated with a first reference signal transmission, or a first frequency-domain allocation comprising at least one subcarrier within a physical resource block associated with the first reference signal transmission, or a first code-domain allocation comprising a sequence associated with the first reference signal transmission, or a first space-domain allocation comprising a beam associated with the first reference signal transmission; and determine a physical sidelink feedback channel transmission resource for a physical sidelink feedback channel transmission in response to the first reference signal transmission at least based on the determined first allocation.

19 Claims, 7 Drawing Sheets

800

810 determining a first allocation comprising at least one of:

a first time-domain allocation comprising at least one symbol within a slot associated with a first reference signal transmission, or a first frequency-domain allocation comprising at least one subcarrier within a physical resource block associated with the first reference signal transmission, or a first code-domain allocation comprising a sequence associated with the first reference signal transmission, or a first space-domain allocation comprising a beam associated with the first reference signal transmission 820 determining a physical sidelink feedback channel transmission resource for a physical sidelink feedback channel transmission in response to the first reference signal transmission at least based on the determined first allocation

(51) Int. Cl.
*H04W 72/0453* (2023.01)
*H04W 72/40* (2023.01)

(58) Field of Classification Search
CPC ............ H04L 5/0048; H04W 72/0466; H04W 72/046; H04W 72/0446; H04W 72/0453; H04W 72/40
See application file for complete search history.

(56) References Cited

U.S. PATENT DOCUMENTS

| | | | | |
|---|---|---|---|---|
| 2022/0345277 | A1 | 10/2022 | Ryu et al. | |
| 2023/0040453 | A1 | 2/2023 | Hosseini et al. | |
| 2024/0007254 | A1* | 1/2024 | Li | H04L 5/0053 |
| 2024/0283602 | A1* | 8/2024 | Ibrahim | H04L 5/0051 |
| 2024/0292433 | A1* | 8/2024 | Elshafie | H04W 72/51 |
| 2024/0349338 | A1* | 10/2024 | Zhou | H04W 72/25 |
| 2024/0414594 | A1* | 12/2024 | Venkob | H04W 72/53 |
| 2025/0240772 | A1* | 7/2025 | Si | H04L 27/26025 |

OTHER PUBLICATIONS

"3rd Generation Partnership Project; Technical Specification Group Radio Access Network; NR; Physical layer procedures for control (Release 17)", 3GPP TS 38.213, V17.5.0, Mar. 2023, pp. 1-262.

"IEEE 802.11", Wikipedia, Retrieved on Aug. 1, 2023, Webpage available at : https://en.wikipedia.org/wiki/IEEE_802.11.

"3rd Generation Partnership Project; Technical Specification Group Radio Access Network; NR; Physical layer procedures for data (Release 17)", 3GPP TS 38.214, V17.5.0, Mar. 2023, pp. 1-231.

"Discussion on enhanced sidelink operation on FR2 licensed spectrum", 3GPP TSG RAN WG1 #112bis-e, R1-2303835, Agenda: 9.4.3, WILUS Inc, Apr. 17-26, 2023, 6 pages.

"Feature lead summary#1 for agenda item 7.2.4.1 Physical layer structure for sidelink", 3GPP TSG RAN WG1 #102-e Meeting, R1-2006107, Agenda: 7.2.4.1, Samsung, Aug. 17-28, 2020, pp. 1-28.

* cited by examiner

800

810 determining a first allocation comprising at least one of:

a first time-domain allocation comprising at least one symbol within a slot associated with a first reference signal transmission, or a first frequency-domain allocation comprising at least one subcarrier within a physical resource block associated with the first reference signal transmission, or a first code-domain allocation comprising a sequence associated with the first reference signal transmission, or a first space-domain allocation comprising a beam associated with the first reference signal transmission

820 determining a physical sidelink feedback channel transmission resource for a physical sidelink feedback channel transmission in response to the first reference signal transmission at least based on the determined first allocation

FIG. 8

ENHANCED PSFCH RESOURCE MAPPING FOR STANDALONE SIDELINK CSI-RS

TECHNICAL FIELD

The examples and non-limiting example embodiments relate generally to communications and, more particularly, to enhanced PSFCH resource mapping for a standalone sidelink CSI-RS.

BACKGROUND

It is known to implement communication between two terminal devices in a communication network.

SUMMARY

In accordance with an aspect, an apparatus includes: at least one processor; and at least one memory storing instructions that, when executed by the at least one processor, cause the apparatus at least to: determine a first allocation comprising at least one of: a first time-domain allocation comprising at least one symbol within a slot associated with a first reference signal transmission, or a first frequency-domain allocation comprising at least one subcarrier within a physical resource block associated with the first reference signal transmission, or a first code-domain allocation comprising a sequence associated with the first reference signal transmission, or a first space-domain allocation comprising a beam associated with the first reference signal transmission; and determine a physical sidelink feedback channel transmission resource for a physical sidelink feedback channel transmission in response to the first reference signal transmission at least based on the determined first allocation.

In accordance with an aspect, a method includes: determining a first allocation comprising at least one of: a first time-domain allocation comprising at least one symbol within a slot associated with a first reference signal transmission, or a first frequency-domain allocation comprising at least one subcarrier within a physical resource block associated with the first reference signal transmission, or a first code-domain allocation comprising a sequence associated with the first reference signal transmission, or a first space-domain allocation comprising a beam associated with the first reference signal transmission; and determining a physical sidelink feedback channel transmission resource for a physical sidelink feedback channel transmission in response to the first reference signal transmission at least based on the determined first allocation.

In accordance with an aspect, a non-transitory program storage device readable by a machine, tangibly embodying a program of instructions executable by the machine for performing operations is provided, the operations including: determining a first allocation comprising at least one of: a first time-domain allocation comprising at least one symbol within a slot associated with a first reference signal transmission, or a first frequency-domain allocation comprising at least one subcarrier within a physical resource block associated with the first reference signal transmission, or a first code-domain allocation comprising a sequence associated with the first reference signal transmission, or a first space-domain allocation comprising a beam associated with the first reference signal transmission; and determining a physical sidelink feedback channel transmission resource for a physical sidelink feedback channel transmission in response to the first reference signal transmission at least based on the determined first allocation.

BRIEF DESCRIPTION OF THE DRAWINGS

The foregoing aspects and other features are explained in the following description, taken in connection with the accompanying drawings.

FIG. 8 is an example method, based on the examples described herein.

DETAILED DESCRIPTION OF EXAMPLE EMBODIMENTS

Figure 1:
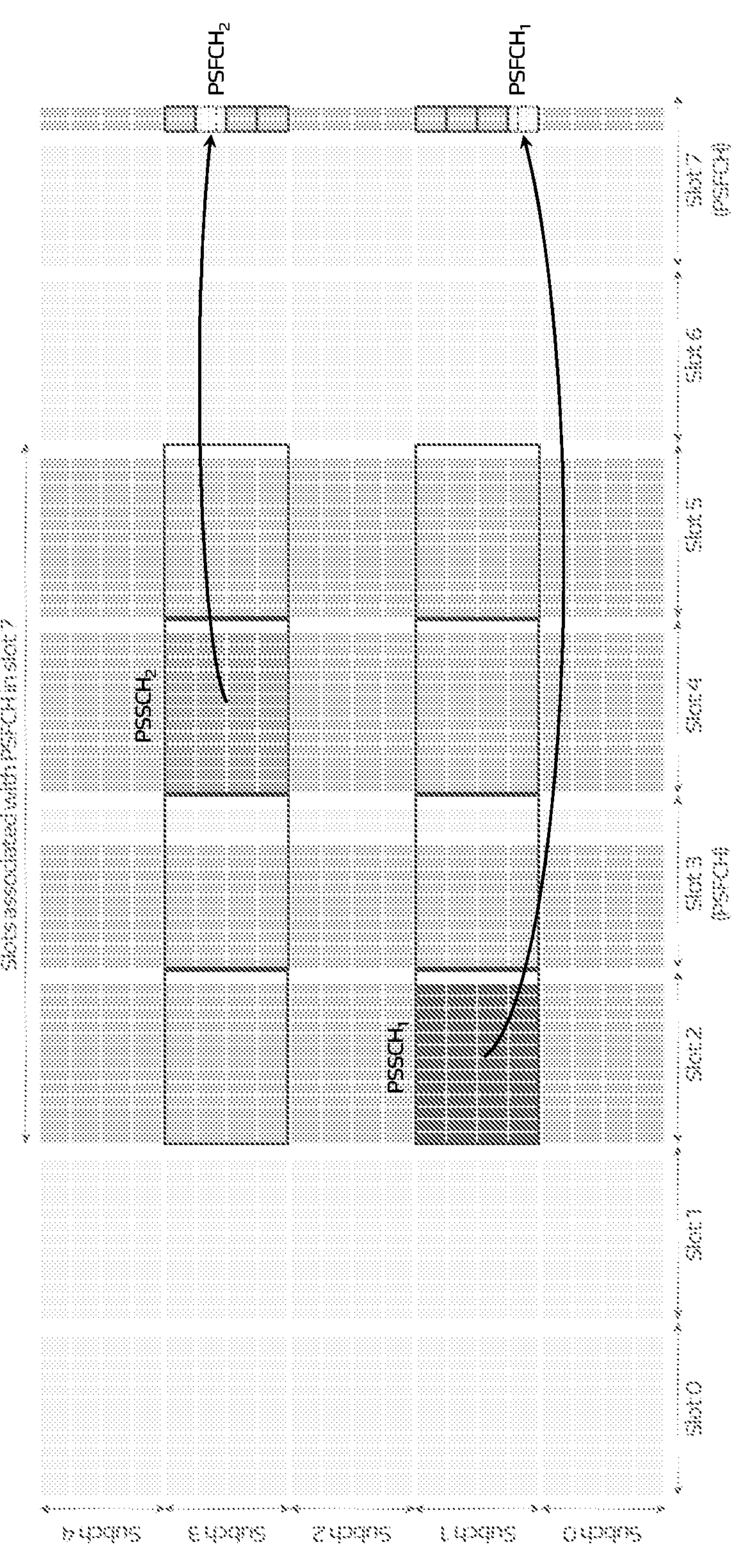
FIG. 1 shows a PSSCH-to-PSFCH resource mapping according to 3GPP TS 38.213.

The examples described herein relate to enhanced PSFCH resource mapping for a standalone sidelink CSI-RS. FIG. 1 illustrates an example of the PSSCH-to-PSFCH resource mapping according to 3GPP TS 38.213, clause 16.3 "UE procedure for reporting and obtaining control information in PSFCH", which was introduced in Rel-16 NR sidelink specifications. For PSSCH transmissions occurring in slots 2-5 (e.g., $PSSCH_1$, $PSSCH_2$), the associated PSFCH transmission occasion occurs in the last few symbols of slot 7. The corresponding PSFCH resources are selected among a set of $$R_{PRB,CS}^{PSFCH}$$

candidate PSFCH resources, corresponding to a set of physical resource blocks (PRB) and/or cyclic shift (CS) pairs, mapped to the slot and subchannel(s) in which the PSSCH is transmitted. The specific PSFCH resource (e.g., $PSFCH_1$, $PSFCH_2$) among the $$R_{PRB,CS}^{PSFCH}$$

candidate PSFCH resources is selected based at least on the L1 source ID of the PSSCH transmitter UE.

The currently standardized PSSCH-to-PSFCH resource mapping defines a correspondence between a given slot-subchannel pair and a set of candidate PSFCH resources. However, for SL beam management in FR2, standalone SL reference signals (e.g., SL CSI-RS) are being considered which may occupy only a small portion of the resource elements (REs) within a slot-subchannel, without any accompanying SL data mapped to the remaining REs.

In order to take advantage of the unused REs, standalone SL CSI-RSs (for transmission by different UEs, or using different beams of a same UE) may be multiplexed by using different time-domain allocations (e.g., OFDM symbols) within a slot (TDM) and/or different frequency-domain allocations (e.g., subcarriers) within a resource block (FDM). In addition, SL CSI-RSs may be multiplexed by using different code-domain allocations (e.g., sequences) (CDM) or by using different space-domain allocations (e.g., transmit beams) (SDM).

If PSFCH is used for beam reporting (e.g., to indicate that a beam associated with a specific SL CSI-RS has resulted in an acceptable received signal strength), then it is desirable for the PSFCH transmission to indicate which of the multiplexed SL CSI-RSs the PSFCH refers to. Otherwise, ambiguities in beam reporting may occur.

Figure 2:
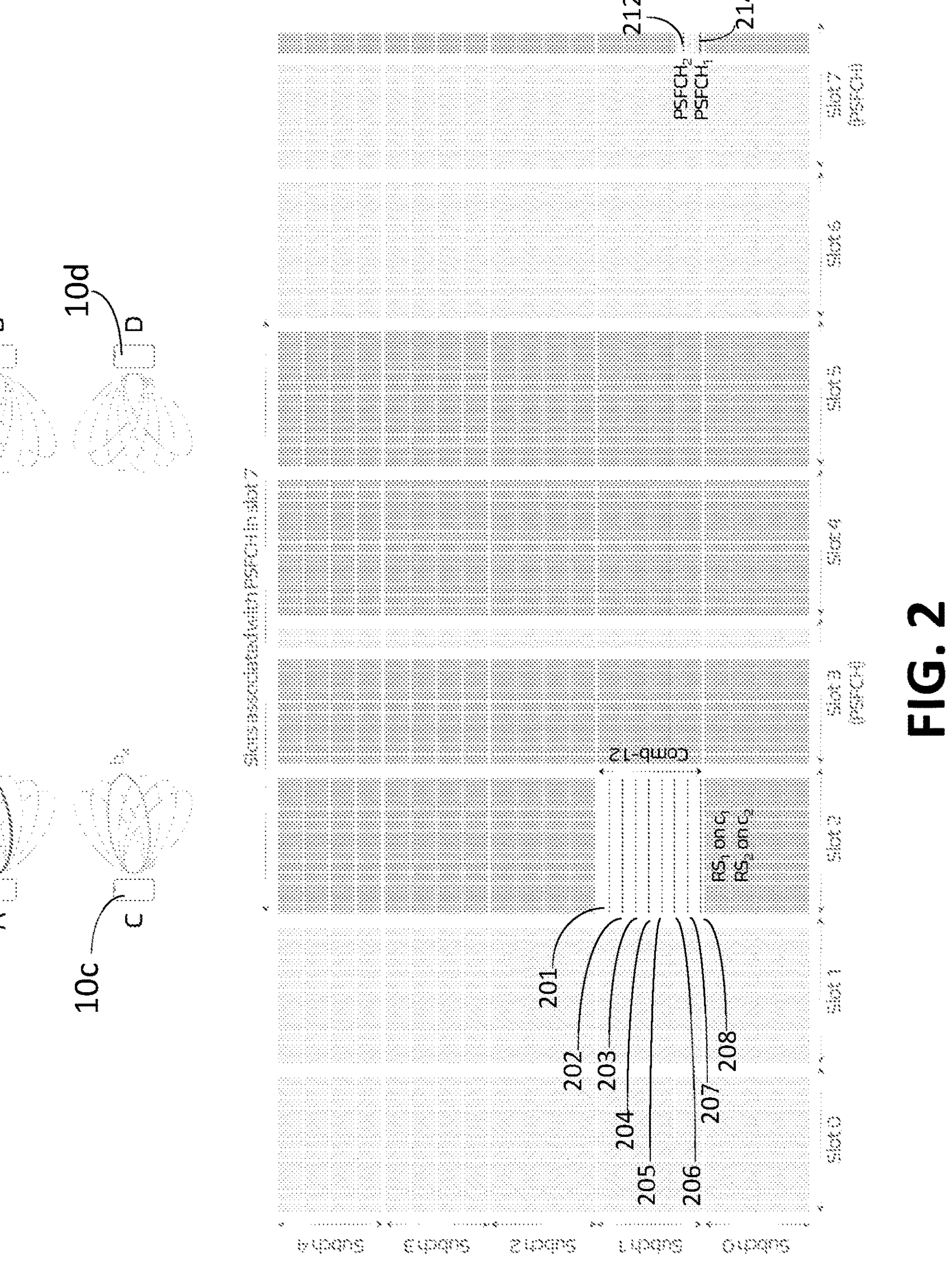
FIG. 2 shows an example of standalone SL CSI-RS ($RS_1$, $RS_2$) multiplexing for SL beam management based on a comb-N structure.

For example, standalone SL CSI-RS may be based on a comb-N structure, i.e., occupying only every $N^{th}$ subcarrier in the frequency domain, as illustrated in FIG. 2 for N=12. In this example, a first UE (A) 10*a* may wish to perform SL beam alignment with a second UE (B) 10*b*. The first UE (A) may determine to transmit a first CSI-RS ($RS_1$) to the second UE (B) on a first beam ($b_1$) using a first transmission comb ($c_1$) (where comb $c_1$ corresponds to items 202, 204, 206, 208 associated with beam $b_1$) within a determined slot-subchannel pair (2,1). Similarly, a third UE (C) 10*c* may wish to perform SL beam alignment with a fourth UE (D) 10*d*. The third UE (C) may determine to transmit a second CSI-RS ($RS_2$) to the fourth UE (D) on a second beam ($b_2$) using a second transmission comb ($c_2$) which is frequency-multiplexed (i.e., orthogonal) with the first transmission comb ($c_1$) within the same slot-subchannel pair (2,1). The second transmission comb $c_2$ corresponds to items 201, 203, 205, 207 associated with beam $b_2$.

Upon measuring the first CSI-RS ($RS_1$), the second UE (B) may determine to transmit a first PSFCH transmission ($PSFCH_1$), e.g., to indicate to the first UE (A) that the first beam ($b_1$) has resulted in an acceptable received signal strength (e.g., RSRP) measurement at the second UE (B) Refer to item 214. If the first PSFCH transmission ($PSFCH_1$) does not specify or indicate (explicitly or implicitly) the first transmission comb ($c_1$) used by the first CSI-RS ($RS_1$), the third UE (C) may receive it and conclude that the second beam ($b_2$) has resulted in an acceptable received signal strength (e.g., RSRP) measurement at the fourth UE (D).

Conversely, referring to item 212, upon measuring the second CSI-RS ($RS_2$), the fourth UE (D) may determine to transmit a second PSFCH transmission ($PSFCH_2$), e.g., to indicate to the third UE (C) that the second beam ($b_2$) has resulted in an acceptable received signal strength (e.g., RSRP) measurement at the fourth UE (D). If the second PSFCH transmission ($PSFCH_2$) does not specify or indicate (explicitly or implicitly) the second transmission comb ($c_2$) used by the second CSI-RS ($RS_2$), the first UE (A) may receive it and conclude that the first beam ($b_1$) has resulted in an acceptable received signal strength (e.g., RSRP) measurement at the second UE (B).

Assuming that k UEs determine to transmit PSFCH associated with a specific slot-subchannel pair and given $$R_{PRB,CS}^{PSFCH}$$

candidate PSFCH resources available per slot-subchannel pair, the probability p that at least 2 responding UEs select the same PSFCH resource (based on the legacy PSFCH resource mapping) upon receiving SL CSI-RSs multiplexed within a same slot-subchannel pair can be obtained as follows:

$$p = 1 - k!\binom{R_{PRB,CS}^{PSFCH}}{k} R_{PRB,CS}^{PSFCH^{-k}}$$

I.e., one minus the probability that each of the k UEs selects a different candidate PSFCH resource (corresponding to the ideal situation). (The above expression assumes that UEs select among the $$R_{PRB,CS}^{PSFCH}$$

available candidate PSFCH resources randomly. According to the specification, the selection is based on the L1 source ID of the (PSSCH or SL CSI-RS) transmitter UE, which, assuming that L1 source IDs are randomly (self-) assigned, is equivalent to random PSFCH resource selection within the $$R_{PRB,CS}^{PSFCH}$$

candidate PSFCH resources available.).

Figure 3:
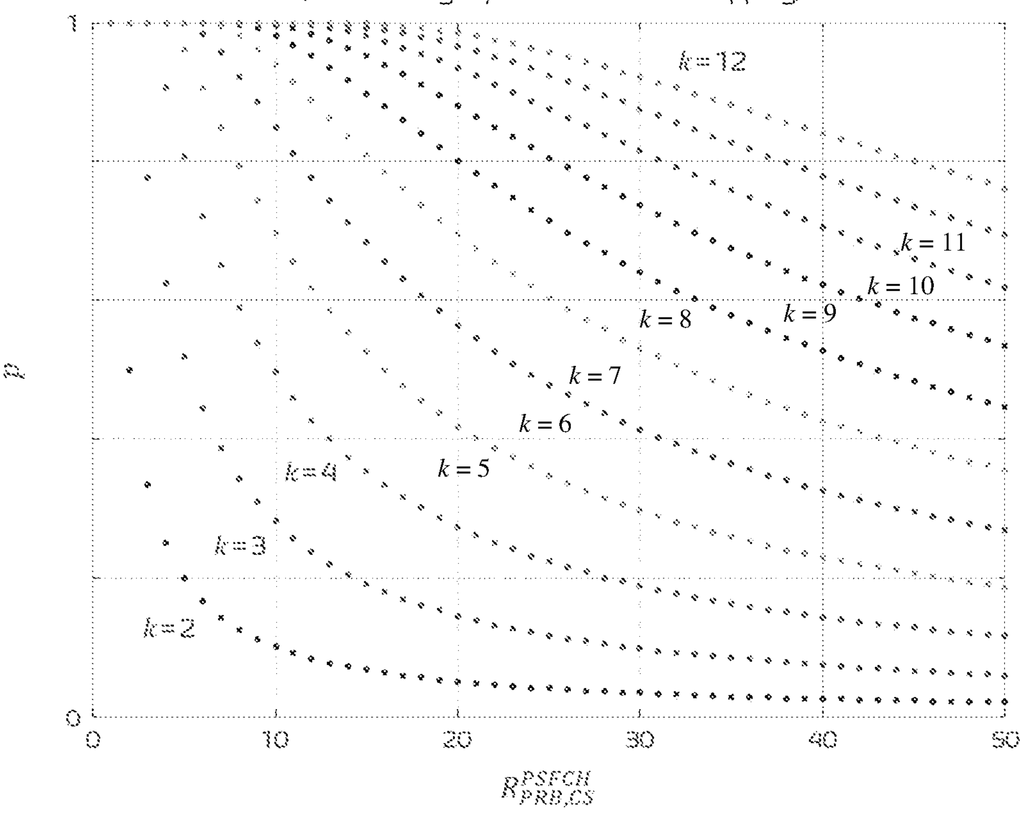
FIG. 3 illustrates the probability that at least two responding UEs select the same PSFCH resource upon receiving SL CSI-RSs multiplexed within a same slot-subchannel pair, based on legacy PSFCH resource mapping.

The probability p is plotted in FIG. 3 for various possible values of k and $$R_{PRB,CS}^{PSFCH}.$$

From these results, it is clear that the legacy PSSCH-to-PSFCH resource mapping is insufficient to allow multiplexing of different SL CSI-RSs within the same slot-subchannel pair. For example, in case of a comb-4 structure, up to k=4 UEs may multiplex their SL CSI-RSs in frequency within a given slot-subchannel pair. Assuming $$R_{PRB,CS}^{PSFCH} = 10\ PSFCH$$

resources are available for a slot-subchannel pair, the probability that 2 or more of the 4 responding UEs select the same PSFCH resource is 49.6%. For sparser transmission combs (e.g., comb-6, comb-12), which allow a higher number of UEs to multiplex their SL CSI-RSs, the situation is even worse. For example, in case of a comb-12 structure, up to k=12 UEs may multiplex their SL CSI-RSs in frequency within a given slot-subchannel pair. Even with $$R_{PRB,CS}^{PSFCH} = 50\ PSFCH$$

resources available for each slot-subchannel pair, the probability that 2 or more of the 12 responding UEs select the same PSFCH resource is as high as 76.2%.

Enhanced PSFCH Resource Mapping for Standalone Sidelink CSI-RS

Figure 4:
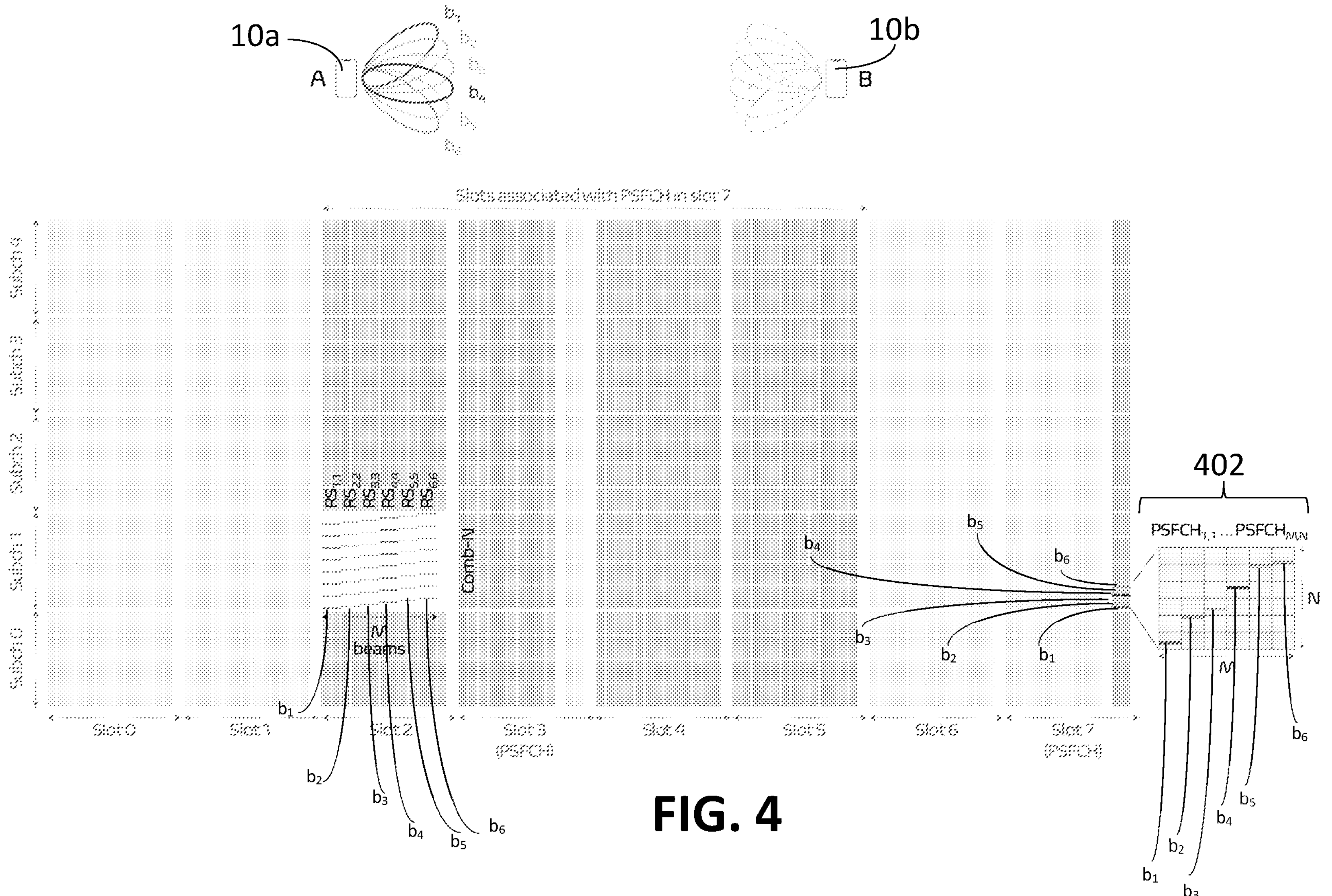
FIG. 4 shows an example of PSFCH resources ($PSFCH_{1,1}$, . . . , $PSFCH_{M,N}$) mapped to different SL CSI-RSs multiplexed (TDM, FDM, CDM, SDM) within a same slot-subchannel pair.

It is proposed to enhance the PSFCH resource mapping (currently specified in clause 16.3 of 3GPP TS 38.213) to allow mapping of different PSFCH resources ($PSFCH_{1,1}$, . . . , $PSFCH_{M,N}$) to different SL CSI-RSs ($RS_{1,1}$, . . . , $RS_{M,N}$), such as those shown including $RS_{1,1}$, $RS_{2,2}$, $RS_{3,3}$, $RS_{4,4}$, $RS_{5,5}$, and $RS_{6,6}$, multiplexed in the time/frequency/code/space domain (TDM, FDM, CDM, SDM) within the same slot and subchannel(s). For example, as shown in FIG. 4, a first UE (A) 10*a* may use different OFDM symbols within a same slot to transmit different SL CSI-RSs ($RS_{1,1}$, . . . , $RS_{M,N}$) using M different transmit beams ($b_1$, . . . , $b_M$), including as shown $b_1$, $b_2$, $b_3$, $b_4$, $b_5$, $b_6$. In addition, different UEs (A, C, etc.) may use different OFDM symbols within a slot and/or different subcarriers within a resource block (e.g., different transmission combs) to transmit their respective SL CSI-RSs without mutual interference. The enhanced PSFCH resource mapping allows a second UE (B) 10*b* to use a PSFCH transmission resource to implicitly indicate a specific (standalone) SL CSI-RS ($RS_{1,1}$, . . . , $RS_{M,N}$), such as those shown including $RS_{1,1}$, $RS_{2,2}$, $RS_{3,3}$, $RS_{4,4}$, $RS_{5,5}$, and $RS_{6,6}$, among multiple SL CSI-RSs multiplexed within the same slot and subchannel(s), corresponding to a particular SL CSI-RS transmitter UE (A, C, etc.) and/or transmit beam ($b_1$, . . . , $b_M$) including as shown $b_1$, $b_2$, $b_3$, $b_4$, $b_5$, $b_6$. FIG. 4 illustrates example mapping 402 of different PSFCH resources ($PSFCH_{1,1}$, . . . , $PSFCH_{M,N}$) to different SL CSI-RSs ($RS_{1,1}$, . . . , $RS_{M,N}$).

As shown in FIG. 4. $RS_{1,1}$ corresponds to beam $b_1$, $RS_{2,2}$ corresponds to beam $b_2$, $RS_{3,3}$ corresponds to beam $b_3$, $RS_{4,4}$ corresponds to beam $b_4$, $RS_{5,5}$ corresponds to beam $b_5$, and $RS_{6,6}$ corresponds to beam $b_6$.

FIG. 4 is only an example, and other beam allocations within a slot or other time unit are possible (for example for a future Radio Access Technology such as 6G).

Described herein is the following:

1. An apparatus comprising: at least one processor; and at least one memory storing instructions that, when executed by the at least one processor, cause the apparatus at least to: a. determine at least one of: i. a first time-domain allocation ($t_1$) comprising at least one symbol within a slot (TDM) associated with a first CSI-RS transmission ($RS_1$), or ii. a first frequency-domain allocation ($f_1$) comprising at least one subcarrier within a physical resource block (FDM) associated with the first CSI-RS transmission ($RS_1$), or iii. a first code-domain allocation ($s_1$) (CDM) comprising a sequence associated with the first CSI-RS transmission ($RS_1$), or iv. a first space-domain allocation ($b_1$) (SDM) comprising a beam associated with the first CSI-RS transmission ($RS_1$); and determine a PSFCH transmission resource ($PSFCH_1$) for a PSFCH transmission in response to the first CSI-RS transmission ($RS_1$) at least based on the determined first allocation ($t_1$, $f_1$, $s_1$, $b_1$).

First UE (A)

2. [First UE (A)] The instructions may further cause the apparatus to: c. perform the first CSI-RS transmission ($RS_1$) according to the determined first allocation ($t_1$, $f_1$, $s_1$, $b_1$), d. listen for the PSFCH transmission in the determined PSFCH transmission resource ($PSFCH_1$).
3. [First UE (A)] The instructions may further cause the apparatus to: e. transmit control information (e.g., SCI) indicating the determined first allocation ($t_1$, $f_1$, $s_1$, $b_1$).
4. [First UE (A)] The instructions may further cause the apparatus to: f. receive control information (e.g., SCI) from at least one third UE (C) indicating a second allocation ($t_2$, $f_2$, $s_2$, $b_2$) for a second CSI-RS transmission ($RS_2$) by the third UE (C), g. determine the first allocation ($t_1$, $f_1$, $s_1$, $b_1$) by excluding the second allocation ($t_2$, $f_2$, $s_2$, $b_2$) from a set of candidate allocations for the first CSI-RS transmission ($RS_1$).

Second UE (B)

5. [Second UE (B)] The instructions may further cause the apparatus to: c. receive the first CSI-RS transmission ($RS_1$), d. determine whether to perform the PSFCH transmission in the determined PSFCH transmission resource ($PSFCH_1$) at least based on a measurement (e.g., RSRP) associated with the first CSI-RS transmission ($RS_1$).
6. [Second UE (B)] The instructions may further cause the apparatus to: e. determine to perform the PSFCH transmission in the determined PSFCH transmission resource ($PSFCH_1$) if the measurement (e.g., RSRP) is above a threshold.
7. [Second UE (B)] The instructions may further cause the apparatus to: f. receive control information (e.g., SCI) indicating the first allocation ($t_1$, $f_1$, $s_1$, $b_1$), g. determine the PSFCH transmission resource ($PSFCH_1$) based on the received control information (e.g., SCI).

Advantages and technical effects of the herein described enhancement include that, the herein described enhancement increases the granularity of the PSFCH resource mapping, allowing a UE to identify the precise time, frequency, code, and/or space domain allocation (within a slot-subchannel pair) of a (standalone) SL CSI-RS transmission, which is not possible with the legacy PSSCH-to-PSFCH resource mapping.

In one embodiment, the (legacy) set of $$R_{PRB,CS}^{PSFCH}$$

candidate PSFCH resources available (e.g., for HARQ-ACK multiplexing) corresponding to a given slot and subchannel(s) may be partitioned into N subsets (of equal size), each mapped to a different SL CSI-RS transmission comb offset n=0, . . . , N−1 in frequency (FDM). For example, a first subset of PSFCH resources corresponding to PSFCH resource indices 0, . . . , $$R_{PRB,CS}^{PSFCH}/N-1$$

may be associated with transmission comb offset n=0 (e.g., corresponding to $RS_{1,1}$, . . . , $RS_{M,1}$ in FIG. 4); a second subset of PSFCH resources corresponding to PSFCH resource indices $$R_{PRB,CS}^{PSFCH}/N,\ \ldots,\ 2R_{PRB,CS}^{PSFCH}/N-1$$

may be associated with transmission comb offset n=1 (e.g., corresponding to $RS_{1,2}$, . . . , $RS_{M,2}$ in FIG. 4), and so on. In this case, a UE may determine a PSFCH resource index for a PSFCH transmission in response to a SL CSI-RS associated with a transmission comb offset n=0, . . . , N−1 as $$n\cdot\frac{R_{PRB,CS}^{PSFCH}}{N}+(P_{ID}+M_{ID})\bmod\frac{R_{PRB,CS}^{PSFCH}}{N}$$

where $P_{ID}$ and $M_{ID}$ are defined in clause 16.3 of 3GPP TS 38.213. In this case, it may be assumed that $$R_{PRB,CS}^{PSFCH}$$

is a multiple of N. In case of unicast, the term $M_{ID}$ (group member ID) may be assumed to be zero.

In another example, every $N^{th}$ PSFCH resource index may be associated with a same transmission comb offset n=0, . . . , N−1. For example, a first subset of PSFCH resources corresponding to PSFCH resource indices 0, N, 2N, . . . , $$\left(R_{PRB,CS}^{PSFCH}/N-1\right)N$$

may be associated . . . , with transmission comb offset n=0; a second subset of PSFCH resources corresponding to PSFCH resource indices 1, N+1, 2N+1, . . . , $$\left(R_{PRB,CS}^{PSFCH}/N-1\right)N+1$$

may be associated with transmission comb offset n=1, and so on. In this case, a UE may determine a PSFCH resource index for a PSFCH transmission in response to a SL CSI-RS associated with a transmission comb offset n=0, . . . , N−1 as $$\left((P_{ID}+M_{ID}) \bmod \frac{R_{PRB,CS}^{PSFCH}}{N}\right)N+n$$

In another embodiment, the (legacy) set of $$R_{PRB,CS}^{PSFCH}$$

candidate PSFCH resources available (e.g., for HARQ-ACK multiplexing) corresponding to a given slot and subchannel(s) may be partitioned into M subsets (of equal size), each mapped to a different (set of) SL CSI-RS transmission symbol(s) m=0, . . . , M−1 within the slot (TDM). For example, a first subset of PSFCH resources corresponding to PSFCH resource indices 0, . . . , $$R_{PRB,CS}^{PSFCH}/M-1$$

may be associated with OFDM symbols {0,1} (m=0) (e.g., corresponding to $RS_{1,1}$, . . . , $RS_{1,N}$ in FIG. 4); a second subset of PSFCH resources corresponding to PSFCH resource indices $$R_{PRB,CS}^{PSFCH}/M,\ \ldots,\ 2R_{PRB,CS}^{PSFCH}/M-1$$

may be associated with OFDM symbols {2,3} (m=1) (e.g., corresponding to $RS_{2,1}$, . . . , $RS_{2,N}$ in FIG. 4), and so on. In this case, a UE may determine a PSFCH resource index for a PSFCH transmission in response to a SL CSI-RS associated with a (set of) SL CSI-RS transmission symbol(s) m=0, . . . , M−1 as $$m\cdot\frac{R_{PRB,CS}^{PSFCH}}{M}+(P_{ID}+M_{ID}) \bmod \frac{R_{PRB,CS}^{PSFCH}}{M}$$

where $P_{ID}$ and $M_{ID}$ are defined in clause 16.3 of 3GPP TS 38.213. In this case, it may be assumed that $$R_{PRB,CS}^{PSFCH}$$

is a multiple of M.

In another embodiment, the (legacy) set of $$R_{PRB,CS}^{PSFCH}$$

candidate PSFCH resources available (e.g., for HARQ-ACK multiplexing) corresponding to a given slot and subchannel(s) may be partitioned into M×N subsets (of equal size), each mapped to a different combination of (set of) SL CSI-RS transmission symbol(s) m=0, . . . , M−1 within the slot (TDM) and SL CSI-RS transmission comb offset n=0, . . . , N−1 in frequency (FDM). For example, a first subset of PSFCH resources corresponding to PSFCH resource indices 0, . . . , $$R_{PRB,CS}^{PSFCH}/(M\times N)-1$$

may be associated with OFDM symbols {0,1} (m=0) and transmission comb offset n=0 (e.g., corresponding to $RS_{1,1}$ in FIG. 4); a second subset of PSFCH resources corresponding to PSFCH resource indices $$R_{PRB,CS}^{PSFCH}/(M\times N),$$

. . . , $$2R_{PRB,CS}^{PDFCH}/(M\times N)-1$$

may be associated with OFDM symbols {2,3} (m=1) and transmission comb offset n=0 (e.g., corresponding to $RS_{2,1}$ in FIG. 4), and so on. In this case, a UE may determine a PSFCH resource index for a PSFCH transmission in response to a SL CSI-RS associated with a (set of) SL CSI-RS transmission symbol(s) m=0, . . . , M−1 and SL CSI-RS transmission comb offset n=0, . . . , N−1 as $$(m+n\cdot M)\cdot\frac{R_{PRB,CS}^{PSFCH}}{M\times N}+(P_{ID}+M_{ID}) \bmod \frac{R_{PRB,CS}^{PSFCH}}{M\times N}$$

or $$(n+m\cdot N)\cdot\frac{R_{PRB,CS}^{PSFCH}}{M\times N}+(P_{ID}+M_{ID}) \bmod \frac{R_{PRB,CS}^{PSFCH}}{M\times N}$$

where $P_{ID}$ and $M_{ID}$ are defined in clause 16.3 of 3GPP TS 38.213. In this case, it may be assumed that $$R_{PRB,CS}^{PSFCH}$$

is a multiple of M×N, and in particular, M is a number of possible time-domain allocations within a slot for a reference signal transmission, N is a number of possible frequency-domain allocations within a physical resource block for a reference signal transmission m=0, . . . , M−1 indicates which of the possible time-domain allocations within a slot is used by the first reference signal transmission, n=0, . . . , N−1 indicates which of the possible frequency-domain allocations within a physical resource block is used by the first reference signal transmission, and $$R_{PRB,CS}^{PSFCH},$$

$P_{ID}$, and $M_{ID}$ are defined in clause 16.3 of 3GPP TS 38.213.2.

In other embodiments, the (legacy) set of $$R_{PRB,CS}^{PSFCH}$$

candidate PSFCH resources available (e.g., for HARQ-ACK multiplexing) corresponding to a given slot and subchannel(s) may be partitioned into subsets (of equal size), each mapped to a different SL CSI-RS sequence (CDM) and/or SL CSI-RS transmit beam (SDM). In this way, a PSFCH transmission may implicitly convey information related to the specific sequence and/or transmit beam used for the associated SL CSI-RS transmission.

First UE (A) Behavior

In one embodiment, the first UE (A) may, upon determining a time/frequency/code/space domain (TDM, FDM, CDM, SDM) allocation ($t_1$, $f_1$, $s_1$, $b_1$) associated with a SL CSI-RS transmission ($RS_1$) to be transmitted by the first UE (A), transmit an indication/reservation of the determined allocation ($t_1$, $f_1$, $s_1$, $b_1$), e.g., using a new SCI field.

In another embodiment, the first UE (A) may receive SCI indicating a reserved time/frequency/code/space domain allocation ($t_2$, $f_2$, $s_2$, $b_2$) for a SL CSI-RS transmission ($RS_2$) by a third UE (C), and determine the allocation ($t_1$, $f_1$, $s_1$, $b_1$) for its own SL CSI-RS transmission ($RS_1$) by excluding the reserved allocation ($t_2$, $f_2$, $s_2$, $b_2$).

Upon transmitting the SL CSI-RS according to the determined allocation ($t_1$, $f_1$, $s_1$, $b_1$), the first UE (A) may monitor a corresponding PSFCH resource ($PSFCH_1$) for a potential PSFCH transmission by the second UE (B) in response to its SL CSI-RS transmission ($RS_1$). For example, if the first UE (A) transmits one or more SL CSI-RS(s) ($RS_1$, . . . , $RS_M$) using one or more transmit beam(s) ($b_1$, . . . , $b_M$), reception of PSFCH(s) associated with one or more of the transmitted SL CSI-RS(s) may indicate that the associated beam(s) is/are acceptable for communication with the second UE (B).

Second UE (B) Behavior

In one embodiment, the second UE (B) may receive SCI from the first UE (A) indicating the time/frequency/code/space domain allocation ($t_1$, $f_1$, $s_1$, $b_1$) associated with the SL CSI-RS transmission ($RS_1$) from the first UE (A), and determine, based on the received SCI, a corresponding PSFCH transmission resource ($PSFCH_1$) for a potential PSFCH transmission by the second UE (B) in response to the SL CSI-RS transmission ($RS_1$).

Upon receiving the SL CSI-RS transmission ($RS_1$) form the first UE (A), the second UE (B) may determine whether or not to perform a PSFCH transmission in response. Such determination may be based on a received signal strength (e.g., RSRP) measured at the second UE (B). For example, if the measurement is above a threshold, the second UE (B) may determine to perform the PSFCH transmission. Otherwise, it may determine not to perform the PSFCH transmission.

In another embodiment, if the second UE (B) is capable of up to K simultaneous PSFCH transmissions (K may be a (pre-) configured parameter or up to UE implementation), the second UE (B) may determine to perform up to K simultaneous PSFCH transmissions, wherein the up to K simultaneous PSFCH transmissions are selected based on the SL CSI-RS measurements (e.g., RSPR) if the SL CSI-RS measurements corresponding to the simultaneous PSFCH transmissions are above a threshold.

Although the examples of measurement used herein relate to RSRP, the various embodiments provided are by no means limited to this measurement quantity and may apply to other measurement quantities such as RSSI, RSRQ, RSCP or RS-SINR.

Although the examples provided herein relate to the NR Radio Access Technology (RAT), the various embodiments are by no means limited to this RAT and may apply to other RATs or systems such as LTE, 6G, 7G, etc. They may apply to other systems such as 802.11, Wi-Fi, DECT, etc.

Figure 5:
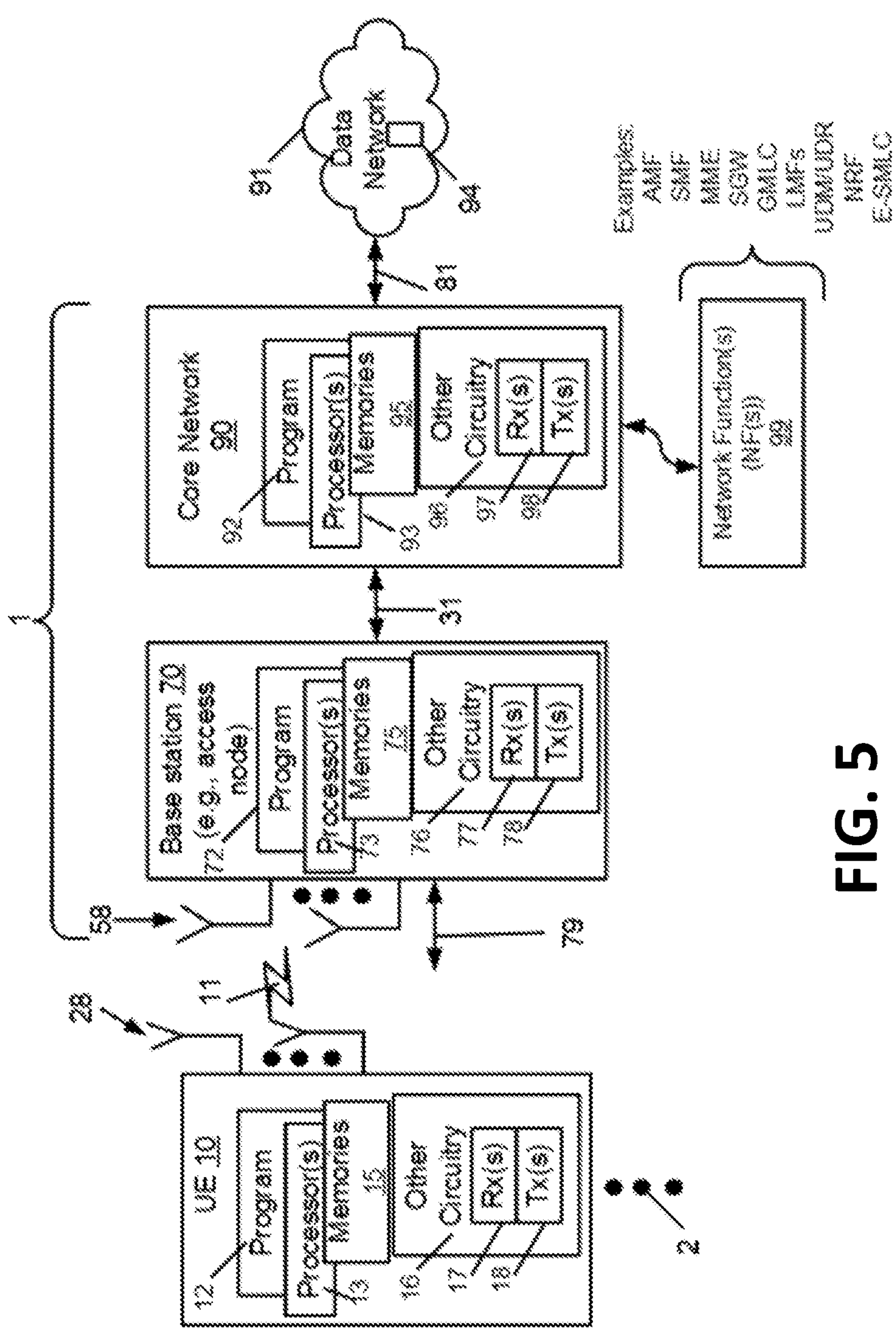
FIG. 5 is a block diagram of one possible and non-limiting system in which the example embodiments may be practiced.

FIG. 5 shows a block diagram of one possible and non-limiting example of a cellular network 1 that is connected to a user equipment (UE) 10. A number of network elements are shown in the cellular network of FIG. 5: a base station 70; and a core network 90.

In FIG. 5, a user equipment (UE) 10 is in wireless communication via radio link 11 with the base station 70 of the cellular network 1. A UE 10 is a wireless communication device, such as a mobile device, that is configured to access a cellular network. The UE 10 is illustrated with one or more antennas 28. The ellipses 2 indicate there could be multiple UEs 10 in wireless communication via radio links with the base station 70. The UE 10 includes one or more processors 13, one or more memories 15, and other circuitry 16. The other circuitry 16 includes one or more receivers (Rx(s)) 17 and one or more transmitters (Tx(s)) 18. A program 12 is used to cause the UE 10 to perform the operations described herein. For a UE 10, the other circuitry 16 could include circuitry such as for user interface elements (not shown) like a display.

The base station 70, as a network element of the cellular network 1, provides the UE 10 access to cellular network 1 and to the data network 91 via the core network 90 (e.g., via a user plane function (UPF) of the core network 90). The base station 70 is illustrated as having one or more antennas 58. In general, the base station 70 is referred to as RAN node 70 herein. An example of a RAN node 70 is a gNB. There are, however, many other examples of RAN nodes including an eNB (LTE base station) or transmission reception point (TRP). The base station 70 includes one or more processors 73, one or more memories 75, and other circuitry 76. The other circuitry 76 includes one or more receivers (Rx(s)) 77 and one or more transmitters (Tx(s)) 78. A program 72 is used to cause the base station 70 to perform the operations described herein.

It is noted that the base station 70 may instead be implemented via other wireless technologies, such as Wi-Fi (a wireless networking protocol that devices use to communicate without direct cable connections). In the case of Wi-Fi, the link 11 could be characterized as a wireless link.

Two or more base stations 70 communicate using, e.g., link(s) 79. The link(s) 79 may be wired or wireless or both and may implement, e.g., an Xn interface for fifth generation (5G), an X2 interface for LTE, or other suitable interface for other standards.

The cellular network 1 may include a core network 90, as a third illustrated element or elements, that may include core network functionality, and which provide connectivity via a link or links 81 with a data network 91, such as a telephone network and/or a data communications network (e.g., the Internet). The core network 90 includes one or more processors 93, one or more memories 95, and other circuitry 96. The other circuitry 96 includes one or more receivers (Rx(s)) 97 and one or more transmitters (Tx(s)) 98. A program 92 is used to cause the core network 90 to perform the operations described herein.

The core network 90 could be a 5GC (5G core network). The core network 90 can implement or comprise multiple network functions (NF(s)) 99, and the program 92 may comprise one or more of the NFs 99. A 5G core network may use hardware such as memory and processors and a virtualization layer. It could be a single standalone computing system, a distributed computing system, or a cloud computing system. The NFs 99, as network elements, of the core network could be containers or virtual machines running on the hardware of the computing system(s) making up the core network 90.

Core network functionality for 5G may include access and mobility management functionality that is provided by a network function 99 such as an access and mobility management function (AMF(s)), session management functionality that is provided by a network function such as a session management function (SMF). Core network functionality for access and mobility management in an LTE network may be provided by an MME (Mobility Management Entity) and/or SGW (Serving Gateway) functionality, which routes data to the data network. Many others are possible, as illustrated by the examples in FIG. 5: AMF; SMF; MME; SGW; gateway mobile location center (GMLC); location management functions (LMFs); unified data management (UDM); unified data repository (UDR); network repository function (NRF); and/or evolved serving mobile location center (E-SMLC). These are merely exemplary core network functionality that may be provided by the core network 90, and note that both 5G and LTE core network functionality might be provided by the core network 90. The radio access network (RAN) node 70 is coupled via a backhaul link 31 to the core network 90. The RAN node 70 and the core network 90 may include an NG interface for 5G, or an S1 interface for LTE, or other suitable interface for other radio access technologies for communicating via the backhaul link 31.

In the data network 91, there is a computer-readable medium 94. The computer-readable medium 94 contains instructions that, when downloaded and installed into the memories 15, 75, or 95 of the corresponding UE 10, base station 70, and/or core network element(s) 90, and executed by processor(s) 13, 73, or 93, cause the respective device to perform corresponding actions described herein. The computer-readable medium 94 may be implemented in other forms, such as via a compact disc or memory stick.

The programs 12, 72, and 92 contain instructions stored by corresponding one or more memories 15, 75, or 95. These instructions, when executed by the corresponding one or more processors 13, 73, or 93, cause the corresponding apparatus 10, 70, or 90, to perform the operations described herein. The computer readable memories 15, 75, or 95 may be of any type suitable to the local technical environment and may be implemented using any suitable data storage technology, such as semiconductor-based memory devices, flash memory, firmware, magnetic memory devices and systems, optical memory devices and systems, fixed memory and removable memory. The computer readable memories 15, 75, and 95 may be means for performing storage functions. The processors 13, 73, and 93, may be of any type suitable to the local technical environment, and may include one or more of general-purpose computers, special purpose computers, microprocessors, digital signal processors (DSPs) and processors based on a multi-core processor architecture, as non-limiting examples. The processors 13, 73, and 93 may be means for causing their respective apparatus to perform functions, such as those described herein.

The receivers 17, 77, and 97, and the transmitters 18, 78, and 98 may implement wired or wireless interfaces. The receivers and transmitters may be grouped together as transceivers.

Figure 6:
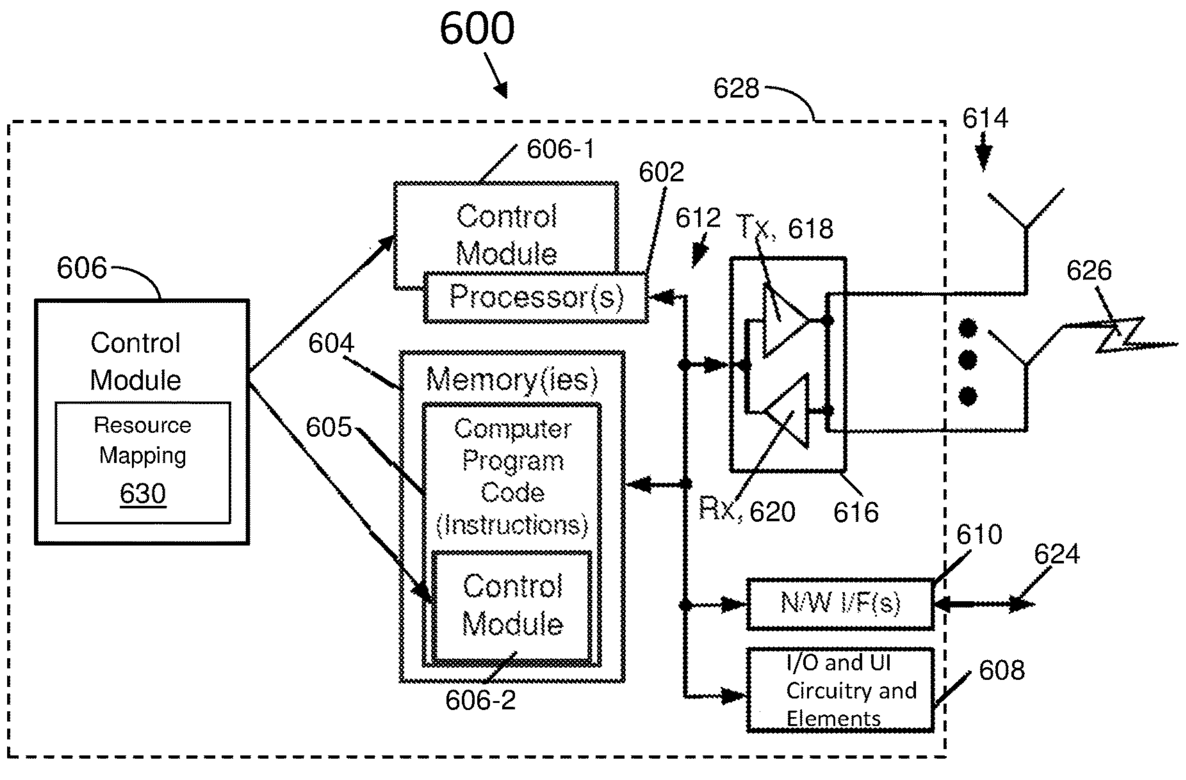
FIG. 6 is an example apparatus configured to implement the examples described herein.

FIG. 6 is an example apparatus 600, which may be implemented in hardware, configured to implement the examples described herein. The apparatus 600 comprises at least one processor 602 (e.g. an FPGA and/or CPU), one or more memories 604 including computer program code 605, the computer program code 605 having instructions to carry out the methods described herein, wherein the at least one memory 604 and the computer program code 605 are configured to, with the at least one processor 602, cause the apparatus 600 to implement circuitry, a process, component, module, or function (implemented with control module 606) to implement the examples described herein, including enhanced PSFCH resource mapping for a standalone sidelink CSI-RS. The memory 604 may be a non-transitory memory, a transitory memory, a volatile memory (e.g. RAM), or a non-volatile memory (e.g. ROM). Resource mapping 630 of the control module implements the herein described aspects related to enhanced PSFCH resource mapping for a standalone sidelink CSI-RS.

The apparatus 600 includes a display and/or I/O interface 608, which includes user interface (UI) circuitry and elements, that may be used to display aspects or a status of the methods described herein (e.g., as one of the methods is being performed or at a subsequent time), or to receive input from a user such as with using a keypad, camera, touchscreen, touch area, microphone, biometric recognition, one or more sensors, etc. The apparatus 600 includes one or more communication e.g. network (N/W) interfaces (I/F(s)) 610. The communication I/F(s) 610 may be wired and/or wireless and communicate over the Internet/other network(s) via any communication technique including via one or more links 624. The link(s) 624 may be the link(s) 11 and/or 79 and/or 31 and/or 81 from FIG. 5. The link(s) 11 and/or 79 and/or 31 and/or 81 from FIG. 5 may also be implemented using transceiver(s) 616 and corresponding wireless link(s) 626. The communication I/F(s) 610 may comprise one or more transmitters or one or more receivers.

The transceiver 616 comprises one or more transmitters 618 and one or more receivers 620. The transceiver 616 and/or communication I/F(s) 610 may comprise standard well-known components such as an amplifier, filter, frequency-converter, (de) modulator, and encoder/decoder circuitries and one or more antennas, such as antennas 614 used for communication over wireless link 626.

The control module 606 of the apparatus 600 comprises one of or both parts 606-1 and/or 606-2, which may be implemented in a number of ways. The control module 606 may be implemented in hardware as control module 606-1, such as being implemented as part of the one or more processors 602. The control module 606-1 may be implemented also as an integrated circuit or through other hardware such as a programmable gate array. In another example, the control module 606 may be implemented as control module 606-2, which is implemented as computer program code (having corresponding instructions) 605 and is executed by the one or more processors 602. For instance, the one or more memories 604 store instructions that, when executed by the one or more processors 602, cause the apparatus 600 to perform one or more of the operations as described herein. Furthermore, the one or more processors 602, the one or more memories 604, and example algorithms (e.g., as flowcharts and/or signaling diagrams), encoded as instructions, programs, or code, are means for causing performance of the operations described herein.

The apparatus 600 to implement the functionality of control 606 may be UE 10, base station 70 (e.g. gNB 70), or core network 90. Thus, processor 602 may correspond to processor(s) 13, processor(s) 73 and/or processor(s) 93, memory 604 may correspond to one or more memories 15, one or more memories 75 and/or one or more memories 95, computer program code 605 may correspond to program 12, program 72, or program 92, communication I/F(s) 610 and/or transceiver 616 may correspond to other circuitry 16, other circuitry 76, or other circuitry 96, and antennas 614 may correspond to antennas 28 or antennas 58.

The apparatus 600 may correspond to first UE (A) 10*a*, second UE (B) 10*b*, third UE (C) 10*c*, or fourth UE (D) 10*d*.

Alternatively, apparatus 600 and its elements may not correspond to either of UE 10, base station 70, or core network and their respective elements, as apparatus 600 may be part of a self-organizing/optimizing network (SON) node or other node, such as a node in a cloud.

The apparatus 600 may also be distributed throughout the network (e.g. 91) including within and between apparatus 600 and any network element (such as core network 90 and/or the base station 70 and/or the UE 10).

Interface 612 enables data communication and signaling between the various items of apparatus 600, as shown in FIG. 6. For example, the interface 612 may be one or more buses such as address, data, or control buses, and may include any interconnection mechanism, such as a series of lines on a motherboard or integrated circuit, fiber optics or other optical communication equipment, and the like. Computer program code (e.g. instructions) 605, including control 606 may comprise object-oriented software configured to pass data or messages between objects within computer program code 605. The apparatus 600 need not comprise each of the features mentioned, or may comprise other features as well. The various components of apparatus 600 may at least partially reside in a common housing 628, or a subset of the various components of apparatus 600 may at least partially be located in different housings, which different housings may include housing 628.

Figure 7:
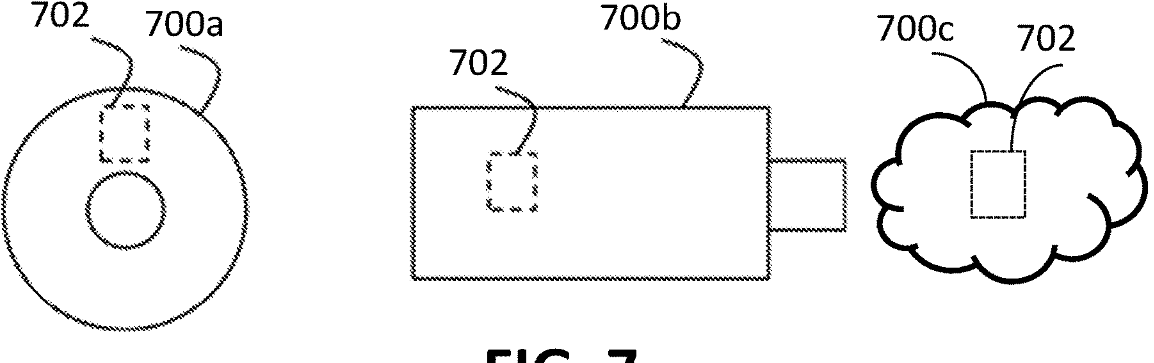
FIG. 7 shows a representation of an example of non-volatile memory media used to store instructions that implement the examples described herein.

FIG. 7 shows a schematic representation of non-volatile memory media 700*a* (e.g. computer/compact disc (CD) or digital versatile disc (DVD)) and 700*b* (e.g. universal serial bus (USB) memory stick) and 700*c* (e.g. cloud storage for downloading instructions and/or parameters 702 or receiving emailed instructions and/or parameters 702) storing instructions and/or parameters 702 which when executed by a processor allows the processor to perform one or more of the steps of the methods described herein.

FIG. 8 is an example method 800, based on the example embodiments described herein. At 810, the method includes determining a first allocation comprising at least one of: a first time-domain allocation comprising at least one symbol within a slot associated with a first reference signal transmission, or a first frequency-domain allocation comprising at least one subcarrier within a physical resource block associated with the first reference signal transmission, or a first code-domain allocation comprising a sequence associated with the first reference signal transmission, or a first space-domain allocation comprising a beam associated with the first reference signal transmission. At 820, the method includes determining a physical sidelink feedback channel transmission resource for a physical sidelink feedback channel transmission in response to the first reference signal transmission at least based on the determined first allocation. Method 800 may be performed with UE 10, UE 10*a*, UE 10*b*, UE 10*c*, UE 10*d*, or apparatus 600.

The following examples are provided and described herein.

Example 1. An apparatus including: at least one processor; and at least one memory storing instructions that, when executed by the at least one processor, cause the apparatus at least to: determine a first allocation comprising at least one of: a first time-domain allocation comprising at least one symbol within a slot associated with a first reference signal transmission, or a first frequency-domain allocation comprising at least one subcarrier within a physical resource block associated with the first reference signal transmission, or a first code-domain allocation comprising a sequence associated with the first reference signal transmission, or a first space-domain allocation comprising a beam associated with the first reference signal transmission; and determine a physical sidelink feedback channel transmission resource for a physical sidelink feedback channel transmission in response to the first reference signal transmission at least based on the determined first allocation.

Example 2. The apparatus of example 1, wherein the first reference signal transmission comprises a channel state information reference signal transmission.

Example 3. The apparatus of any of examples 1 to 2, wherein the instructions, when executed by the at least one processor, cause the apparatus at least to: perform the first reference signal transmission according to the determined first allocation; and listen for the physical sidelink feedback channel transmission in the determined physical sidelink feedback channel transmission resource.

Example 4. The apparatus of any of examples 1 to 3, wherein the instructions, when executed by the at least one processor, cause the apparatus at least to: transmit control information indicating the determined first allocation.

Example 5. The apparatus of example 4, wherein the control information comprises sidelink control information.

Example 6. The apparatus of any of examples 1 to 5, wherein the instructions, when executed by the at least one processor, cause the apparatus at least to: receive control information from at least one user equipment indicating a second allocation for a second reference signal transmission by the at least one user equipment; wherein the second allocation comprises at least one of: a second time-domain allocation comprising at least one symbol within a slot associated with the second reference signal transmission, or a second frequency-domain allocation comprising at least one subcarrier within a physical resource block associated with the second reference signal transmission, or a second code-domain allocation comprising a sequence associated with the second reference signal transmission, or a second space-domain allocation comprising a beam associated with the second reference signal transmission; and determine the first allocation by excluding the second allocation from a set of candidate allocations for the first reference signal transmission.

Example 7. The apparatus of example 6, wherein the second reference signal transmission comprises a channel state information reference signal transmission.

Example 8. The apparatus of any of examples 6 to 7, wherein the control information comprises sidelink control information.

Example 9. The apparatus of any of examples 1 to 8, wherein the instructions, when executed by the at least one processor, cause the apparatus at least to: receive the first reference signal transmission; and determine whether to perform the physical sidelink feedback channel transmission in the determined physical sidelink feedback channel transmission resource at least based on a measurement associated with the first reference signal transmission.

Example 10. The apparatus of example 9, wherein the measurement comprises a reference signal received power measurement.

Example 11. The apparatus of any of examples 9 to 10, wherein the instructions, when executed by the at least one processor, cause the apparatus at least to: determine to perform the physical sidelink feedback channel transmission in the determined physical sidelink feedback channel transmission resource when the measurement is above a threshold.

Example 12. The apparatus of any of examples 1 to 11, wherein the instructions, when executed by the at least one processor, cause the apparatus at least to: receive control information indicating the first allocation; and determine the physical sidelink feedback channel transmission resource based on the received control information.

Example 13. The apparatus of example 12, wherein the control information comprises sidelink control information.

Example 14. The apparatus of any of examples 1 to 13, wherein the apparatus comprises a user equipment.

Example 15. The apparatus of any of example 1 to 14, wherein determining the physical sidelink feedback channel transmission resource comprises determining a physical sidelink feedback channel transmission resource index according to:

$$(m + n \cdot M) \cdot \frac{R_{PRB,CS}^{PSFCH}}{M \times N} + (P_{ID} + M_{ID}) \bmod \frac{R_{PRB,CS}^{PSFCH}}{M \times N}$$

or $$(n + m \cdot N) \cdot \frac{R_{PRB,CS}^{PSFCH}}{M \times N} + (P_{ID} + M_{ID}) \bmod \frac{R_{PRB,CS}^{PSFCH}}{M \times N}$$

wherein

M is a number of possible time-domain allocations within a slot for a reference signal transmission;

N is a number of possible frequency-domain allocations within a physical resource block for the reference signal transmission;

m indicates which of the possible time-domain allocations within a slot is used by the first reference signal transmission;

n indicates which of the possible frequency-domain allocations within a physical resource block is used by the first reference signal transmission;

$$R_{PRB,CS}^{PSFCH}$$

is a number of physical sidelink feedback channel transmission resources available for multiplexing control information in a physical sidelink feedback channel transmission;

$P_{ID}$ is a physical layer source identifier; and $M_{ID}$ is a group member identifier.

Example 16. The apparatus of example 15, wherein: m is an integer having a value that ranges from 0 to M−1, and n is an integer having a value that ranges from 0 to N−1.

Example 17. The apparatus of any of examples 15 to 16, wherein at least one of M or N is larger than 1.

Example 18. A method including: determining a first allocation comprising at least one of: a first time-domain allocation comprising at least one symbol within a slot associated with a first reference signal transmission, or a first frequency-domain allocation comprising at least one subcarrier within a physical resource block associated with the first reference signal transmission, or a first code-domain allocation comprising a sequence associated with the first reference signal transmission, or a first space-domain allocation comprising a beam associated with the first reference signal transmission; and determining a physical sidelink feedback channel transmission resource for a physical sidelink feedback channel transmission in response to the first reference signal transmission at least based on the determined first allocation.

Example 19. The method of example 18, further including: performing the first reference signal transmission according to the determined first allocation; and listening for the physical sidelink feedback channel transmission in the determined physical sidelink feedback channel transmission resource.

Example 20. The method of any of examples 18 to 19, further including: receiving the first reference signal transmission; and determining whether to perform the physical sidelink feedback channel transmission in the determined physical sidelink feedback channel transmission resource at least based on a measurement associated with the first reference signal transmission.

Example 21. An apparatus including: means for determining a first allocation comprising at least one of: a first time-domain allocation comprising at least one symbol within a slot associated with a first reference signal transmission, or a first frequency-domain allocation comprising at least one subcarrier within a physical resource block associated with the first reference signal transmission, or a first code-domain allocation comprising a sequence associated with the first reference signal transmission, or a first space-domain allocation comprising a beam associated with the first reference signal transmission; and means for determining a physical sidelink feedback channel transmission resource for a physical sidelink feedback channel transmission in response to the first reference signal transmission at least based on the determined first allocation.

Example 22. A non-transitory program storage device readable by a machine, tangibly embodying a program of instructions executable by the machine for performing operations, the operations including: determining a first allocation comprising at least one of: a first time-domain allocation comprising at least one symbol within a slot associated with a first reference signal transmission, or a first frequency-domain allocation comprising at least one subcarrier within a physical resource block associated with the first reference signal transmission, or a first code-domain allocation comprising a sequence associated with the first reference signal transmission, or a first space-domain allocation comprising a beam associated with the first reference signal transmission; and determining a physical sidelink feedback channel transmission resource for a physical sidelink feedback channel transmission in response to the first reference signal transmission at least based on the determined first allocation.

Example 23. The non-transitory program storage device of example 22, wherein the operations further include: performing the first reference signal transmission according to the determined first allocation; and listening for the physical sidelink feedback channel transmission in the determined physical sidelink feedback channel transmission resource.

Example 24. The non-transitory program storage device of any of examples 22 to 23, wherein the operations further include: receiving the first reference signal transmission; and determining whether to perform the physical sidelink feedback channel transmission in the determined physical sidelink feedback channel transmission resource at least based on a measurement associated with the first reference signal transmission.

References to a 'computer', 'processor', etc. should be understood to encompass not only computers having different architectures such as single/multi-processor architectures and sequential or parallel architectures but also specialized circuits such as field-programmable gate arrays (FPGAs), application specific circuits (ASICs), signal processing devices and other processing circuitry. References to computer program, instructions, code etc. should be understood to encompass software for a programmable processor or firmware such as, for example, the programmable content of a hardware device whether instructions for a processor, or configuration settings for a fixed-function device, gate array or programmable logic device etc.

The memories as described herein may be implemented using any suitable data storage technology, such as semiconductor based memory devices, flash memory, magnetic memory devices and systems, optical memory devices and systems, non-transitory memory, transitory memory, fixed memory and removable memory. The memories may comprise a database for storing data.

As used herein, the term 'circuitry' may refer to the following: (a) hardware circuit implementations, such as implementations in analog and/or digital circuitry, and (b) combinations of circuits and software (and/or firmware), such as (as applicable): (i) a combination of processor(s) or (ii) portions of processor(s)/software including digital signal processor(s), software, and memories that work together to cause an apparatus to perform various functions, and (c) circuits, such as a microprocessor(s) or a portion of a microprocessor(s), that require software or firmware for operation, even if the software or firmware is not physically present. As a further example, as used herein, the term 'circuitry' would also cover an implementation of merely a processor (or multiple processors) or a portion of a processor and its (or their) accompanying software and/or firmware. The term 'circuitry' would also cover, for example and if applicable to the particular element, a baseband integrated circuit or applications processor integrated circuit for a mobile phone or a similar integrated circuit in a server, a cellular network device, or another network device.

It should be understood that the foregoing description is only illustrative. Various alternatives and modifications may be devised by those skilled in the art. For example, features recited in the various dependent claims could be combined with each other in any suitable combination(s). In addition, features from different example embodiments described above could be selectively combined into a new example embodiment. Accordingly, this description is intended to embrace all such alternatives, modifications and variances which fall within the scope of the appended claims.

The following acronyms and abbreviations that may be found in the specification and/or the drawing figures are given as follows (the abbreviations and acronyms may be appended with each other or with other characters using e.g. a dash. hyphen, slash, or number. and may be case insensitive):

| | |
|---|---|
| 3GPP | third generation partnership project |
| 4G | fourth generation |
| 5G | fifth generation |
| 5GC | 5G core network |
| 6G | sixth generation |
| 7G | seventh generation |
| ACK | acknowledgement |
| AMF | access and mobility management function |
| ASIC | application-specific integrated circuit |
| CD | compact/computer disc |
| CDM | code division multiplexing |
| CPU | central processing unit |
| CS | cyclic shift |
| CSI | channel state information |
| CSI-RS | channel state information reference signal |
| DECT | digital enhanced cordless telecommunications |
| DSP | digital signal processor |
| DVD | digital versatile disc |
| eNB | evolved Node B (e.g., an LTE base station) |
| EPC | evolved packet core |
| E-SMLC | evolved serving mobile location center |
| FDM | frequency division multiplexing |
| FPGA | field-programmable gate array |
| FR | frequency range |
| GMLC | gateway mobile location center |
| gNB | base station for 5G/NR, i.e., a node providing NR user plane and control plane protocol terminations towards the UE, and connected via the NG interface to the 5GC |
| HARQ | hybrid automatic repeat request |
| ID | identifier |
| I/F | interface |
| I/O | input/output |
| L1 | layer 1 |
| LMF | location management function |
| LTE | long term evolution (4G) |
| MME | mobility management entity |
| N | number (e.g. comb-N) |
| NF | network function |
| NG | new generation |
| NG-RAN | new generation radio access network |

-continued

| | |
|---|---|
| NR | new radio |
| NRF | network repository function |
| N/W | network |
| OFDM | orthogonal frequency division multiplexing |
| PRB | physical resource block |
| PSFCH | physical sidelink feedback channel |
| PSSCH | physical sidelink shared channel |
| RAM | random access memory |
| RAN | radio access network |
| RAN# | RAN meeting |
| RAN1 | radio layer 1 |
| RAN2 | radio layer 2 |
| RAT | radio access technology |
| RE | resource element |
| Rel | release |
| ROM | read-only memory |
| RP | RAN plenary |
| RS | reference signal |
| RSCP | received signal code power |
| RSRP | reference signal received power |
| RSRQ | reference signal received quality |
| RSSI | received signal strength indicator |
| Rx | receiver or reception |
| S1 | interface connecting the eNB to the EPC |
| SCI | sidelink control information |
| SDM | space division multiplexing |
| SGW | serving gateway |
| SINR | signal-to-interference-plus-noise ratio |
| SL | sidelink |
| SMF | session management function |
| SON | self-organizing/optimizing network |
| Subch | subchannel |
| TDM | time division multiplexing |
| TRP | transmission reception point |
| TS | technical specification |
| Tx | transmitter or transmission |
| UDM | unified data management |
| UDR | unified data repository |
| UE | user equipment (e.g., a wireless, typically mobile device) |
| UI | user interface |
| UPF | user plane function |
| USB | universal serial bus |
| Wi-Fi | wireless networking protocol that devices use to communicate without direct cable connections |
| X2 | network interface between RAN nodes and between RAN and the core network |
| Xn | network interface between NG-RAN nodes |

What is claimed is:

1. An apparatus comprising:

at least one processor; and at least one memory storing instructions that, when executed by the at least one processor, cause the apparatus at least to:

determine a first allocation comprising at least one of:

a first time-domain allocation comprising at least one symbol within a slot associated with a first reference signal transmission, or a first frequency-domain allocation comprising at least one subcarrier within a physical resource block associated with the first reference signal transmission, or a first code-domain allocation comprising a sequence associated with the first reference signal transmission, or a first space-domain allocation comprising a beam associated with the first reference signal transmission; and determine a physical sidelink feedback channel transmission resource for a physical sidelink feedback channel transmission in response to the first reference signal transmission at least based on the determined first allocation, wherein determining the physical sidelink feedback channel transmission resource comprises determining a physical sidelink feedback channel transmission resource index according to:

$$(m + n\cdot \text{Math}\cdot M)\cdot \text{Math}\cdot \frac{R_{PRB,CS}^{PSFCH}}{M\times N} + (P_{ID} + M_{ID})\text{mod}\frac{R_{PRB,CS}^{PSFCH}}{M\times N} \text{ or}$$

$$(n + m\cdot \text{Math}\cdot N)\cdot \text{Math}\cdot \frac{R_{PRB,CS}^{PSFCH}}{M\times N} + (P_{ID} + M_{ID})\text{mod}\frac{R_{PRB,CS}^{PSFCH}}{M\times N}$$

Wherein

M is a number of possible time-domain allocations within a slot for a reference signal transmission;

N is a number of possible frequency-domain allocations within a physical resource block for the reference signal transmission;

m indicates which of the possible time-domain allocations within a slot is used by the first reference signal transmission;

n indicates which of the possible frequency-domain allocations within a physical resource block is used by the first reference signal transmission;

$$R_{PRB,CS}^{PSFCH}$$

is a number of physical sidelink feedback channel transmission resources available for multiplexing control information in a physical sidelink feedback channel transmission;

$P_{ID}$ is a physical layer source identifier; and $M_{ID}$ is a group member identifier.

2. The apparatus of claim 1, wherein the first reference signal transmission comprises a channel state information reference signal transmission.

3. The apparatus of claim 1, wherein the instructions, when executed by the at least one processor, cause the apparatus at least to:

perform the first reference signal transmission according to the determined first allocation; and listen for the physical sidelink feedback channel transmission in the determined physical sidelink feedback channel transmission resource.

4. The apparatus of claim 1, wherein the instructions, when executed by the at least one processor, cause the apparatus at least to:

transmit control information indicating the determined first allocation.

5. The apparatus of claim 4, wherein the control information comprises sidelink control information.

6. The apparatus of claim 1, wherein the instructions, when executed by the at least one processor, cause the apparatus at least to:

receive control information from at least one user equipment indicating a second allocation for a second reference signal transmission by the at least one user equipment;

wherein the second allocation comprises at least one of:

a second time-domain allocation comprising at least one symbol within a slot associated with the second reference signal transmission, or a second frequency-domain allocation comprising at least one subcarrier within a physical resource block associated with the second reference signal transmission, or a second code-domain allocation comprising a sequence associated with the second reference signal transmission, or a second space-domain allocation comprising a beam associated with the second reference signal transmission; and determine the first allocation by excluding the second allocation from a set of candidate allocations for the first reference signal transmission.

7. The apparatus of claim 6, wherein the second reference signal transmission comprises a channel state information reference signal transmission.

8. The apparatus of claim 6, wherein the control information comprises sidelink control information.

9. The apparatus of claim 1, wherein the instructions, when executed by the at least one processor, cause the apparatus at least to:

receive the first reference signal transmission; and determine whether to perform the physical sidelink feedback channel transmission in the determined physical sidelink feedback channel transmission resource at least based on a measurement associated with the first reference signal transmission.

10. The apparatus of claim 9, wherein the measurement comprises a reference signal received power measurement.

11. The apparatus of claim 9, wherein the instructions, when executed by the at least one processor, cause the apparatus at least to:

determine to perform the physical sidelink feedback channel transmission in the determined physical sidelink feedback channel transmission resource when the measurement is above a threshold.

12. The apparatus of claim 1, wherein the instructions, when executed by the at least one processor, cause the apparatus at least to:

receive control information indicating the first allocation; and determine the physical sidelink feedback channel transmission resource based on the received control information.

13. The apparatus of claim 12, wherein the control information comprises sidelink control information.

14. The apparatus of claim 1, wherein the apparatus comprises a user equipment.

15. The apparatus of claim 1, wherein:

m is an integer having a value that ranges from 0 to M−1, and n is an integer having a value that ranges from 0 to N−1.

16. The apparatus of claim 1, wherein at least one of M or N is larger than 1.

17. A method comprising:

determining a first allocation comprising at least one of:

a first time-domain allocation comprising at least one symbol within a slot associated with a first reference signal transmission, or a first frequency-domain allocation comprising at least one subcarrier within a physical resource block associated with the first reference signal transmission, or a first code-domain allocation comprising a sequence associated with the first reference signal transmission, or a first space-domain allocation comprising a beam associated with the first reference signal transmission; and determining a physical sidelink feedback channel transmission resource for a physical sidelink feedback channel transmission in response to the first reference signal transmission at least based on the determined first allocation, wherein determining the physical sidelink feedback channel transmission resource comprises determining a physical sidelink feedback channel transmission resource index according to:

$$(m+n\cdot \mathrm{Math}\cdot M)\cdot \mathrm{Math}\cdot \frac{R_{PRB,CS}^{PSFCH}}{M\times N}+(P_{ID}+M_{ID})\mathrm{mod}\frac{R_{PRB,CS}^{PSFCH}}{M\times N}\ \text{or}$$

$$(n+m\cdot \mathrm{Math}\cdot N)\cdot \mathrm{Math}\cdot \frac{R_{PRB,CS}^{PSFCH}}{M\times N}+(P_{ID}+M_{ID})\mathrm{mod}\frac{R_{PRB,CS}^{PSFCH}}{M\times N}$$

Wherein

M is a number of possible time-domain allocations within a slot for a reference signal transmission;

N is a number of possible frequency-domain allocations within a physical resource block for the reference signal transmission;

m indicates which of the possible time-domain allocations within a slot is used by the first reference signal transmission;

n indicates which of the possible frequency-domain allocations within a physical resource block is used by the first reference signal transmission;

$$R_{PRB,CS}^{PSFCH}$$

is a number of physical sidelink feedback channel transmission resources available for multiplexing control information in a physical sidelink feedback channel transmission;

$P_{ID}$ is a physical layer source identifier; and $M_{ID}$ is a group member identifier.

18. The method of claim 17, further comprising:

performing the first reference signal transmission according to the determined first allocation; and listening for the physical sidelink feedback channel transmission in the determined physical sidelink feedback channel transmission resource.

19. A non-transitory program storage device readable by a machine, tangibly embodying a program of instructions executable by the machine for performing operations, the operations comprising:

determining a first allocation comprising:

a first time-domain allocation comprising at least one symbol within a slot associated with a first reference signal transmission, a first frequency-domain allocation comprising at least one subcarrier within a physical resource block associated with the first reference signal transmission, a first code-domain allocation comprising a sequence associated with the first reference signal transmission; and determining a physical sidelink feedback channel transmission resource for a physical sidelink feedback channel transmission in response to the first reference signal transmission at least based on the determined first allocation, wherein determining the physical sidelink feedback channel transmission resource comprises determining a physical sidelink feedback channel transmission resource index according to:

$$(m + n \cdot \text{Math} \cdot M) \cdot \text{Math} \cdot \frac{R_{PRB,CS}^{PSFCH}}{M \times N} + (P_{ID} + M_{ID}) \bmod \frac{R_{PRB,CS}^{PSFCH}}{M \times N} \text{ or}$$

$$(n + m \cdot \text{Math} \cdot N) \cdot \text{Math} \cdot \frac{R_{PRB,CS}^{PSFCH}}{M \times N} + (P_{ID} + M_{ID}) \bmod \frac{R_{PRB,CS}^{PSFCH}}{M \times N}$$

Wherein

M is a number of possible time-domain allocations within a slot for a reference signal transmission;

N is a number of possible frequency-domain allocations within a physical resource block for the reference signal transmission;

m indicates which of the possible time-domain allocations within a slot is used by the first reference signal transmission;

n indicates which of the possible frequency-domain allocations within a physical resource block is used by the first reference signal transmission;

$$R_{PRB,CS}^{PSFCH}$$

is a number of physical sidelink feedback channel transmission resources available for multiplexing control information in a physical sidelink feedback channel transmission;

$P_{ID}$ is a physical layer source identifier; and $M_{ID}$ is a group member identifier.

* * * * *